United States Patent
Chen

(10) Patent No.: US 11,876,720 B2
(45) Date of Patent: Jan. 16, 2024

(54) MEDIA PACKET FORWARDING METHOD, FORWARDING SERVER, AND STORAGE MEDIUM

(71) Applicant: TENCENT TECHNOLOGY (SHENZHEN) COMPANY LIMITED, Shenzhen (CN)

(72) Inventor: Zexian Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 258 days.

(21) Appl. No.: 17/344,163

(22) Filed: Jun. 10, 2021

(65) Prior Publication Data

US 2021/0306274 A1  Sep. 30, 2021

Related U.S. Application Data

(63) Continuation of application No. PCT/CN2020/081261, filed on Mar. 26, 2020.

(30) Foreign Application Priority Data

Apr. 16, 2019 (CN) .......................... 201910303532.5

(51) Int. Cl.
*H04L 47/24* (2022.01)
*H04L 47/32* (2022.01)
*H04L 65/65* (2022.01)

(52) U.S. Cl.
CPC .............. *H04L 47/24* (2013.01); *H04L 47/32* (2013.01); *H04L 65/65* (2022.05)

(58) Field of Classification Search
None
See application file for complete search history.

(56) References Cited

U.S. PATENT DOCUMENTS 7,233,605 B1 * 6/2007 Oran .................... H04L 65/765
370/526
8,331,269 B2  12/2012 Li et al.
(Continued)

FOREIGN PATENT DOCUMENTS

CA        2681525 A1 *  3/2011  ............ G06Q 10/00
CN     101409609 A      4/2009
(Continued)

OTHER PUBLICATIONS

The World Intellectual Property Organization (WIPO) International Search Report for PCT/CN2020/081261 dated Jun. 23, 2020 5 Pages (including translation).
(Continued)

*Primary Examiner* — Ajit Patel
*Assistant Examiner* — Liem H. Nguyen
(74) *Attorney, Agent, or Firm* — ANOVA LAW GROUP, PLLC

(57) ABSTRACT

The embodiments of this application provide a media packet forwarding method and a forwarding server. The method includes determining, by the forwarding server after receiving a to-be-forwarded RTP media packet, a type of the to-be-forwarded RTP media packet, then determining a priority of the to-be-forwarded RTP media packet according to the type of the to-be-forwarded RTP media packet, and forwarding an RTP media packet having a higher priority, selecting between the received to-be-forwarded RTP media packet and an RTP media packet being currently forwarded.

19 Claims, 9 Drawing Sheets

(56) References Cited

U.S. PATENT DOCUMENTS

| | | | |
|---|---|---|---|
| 9,001,701 B1 | 4/2015 | Zhang et al. | |
| 10,645,128 B2 | 5/2020 | Liu et al. | |
| 2003/0002481 A1* | 1/2003 | Laursen | H04L 61/00 370/352 |
| 2008/0025295 A1* | 1/2008 | Elliott | H04L 9/40 370/356 |
| 2008/0037440 A1* | 2/2008 | Politowicz | H04L 69/22 370/253 |
| 2008/0095107 A1* | 4/2008 | Tillotson | H04W 72/56 370/329 |
| 2008/0310428 A1* | 12/2008 | Lei | H04L 69/22 370/400 |
| 2010/0202368 A1 | 8/2010 | Hans | |
| 2010/0260185 A1* | 10/2010 | Wang | H04L 47/12 370/392 |
| 2010/0322095 A1* | 12/2010 | Okada | H04L 43/0835 370/252 |
| 2013/0301656 A1* | 11/2013 | Park | H04N 21/2381 370/474 |
| 2014/0297805 A1* | 10/2014 | Chaplot | H04L 65/65 709/219 |
| 2014/0307624 A1* | 10/2014 | Kim | H04N 21/6131 370/328 |
| 2015/0229970 A1 | 8/2015 | Ma et al. | |
| 2018/0139250 A1* | 5/2018 | Liu | H04L 65/611 |
| 2019/0356612 A1* | 11/2019 | Hikimochi | H04L 49/9084 |
| 2019/0394058 A1* | 12/2019 | Montcalm | H04L 43/50 |

FOREIGN PATENT DOCUMENTS

| | | | | |
|---|---|---|---|---|
| CN | 101742001 A | * | 6/2010 | |
| CN | 102195948 A | | 9/2011 | |
| CN | 103733580 A | | 4/2014 | |
| CN | 106302377 A | | 1/2017 | |
| CN | 106453312 A | * | 2/2017 | H04L 69/03 |
| CN | 106454201 A | | 2/2017 | |
| CN | 107147653 A | | 9/2017 | |
| CN | 110198279 A | | 9/2019 | |

OTHER PUBLICATIONS

The State Intellectual Property Office of the People's Republic of China (SIPO) Office Action 1 for for 201910303532.5 dated Oct. 29, 2021 10 Pages (including translation).

The European Patent Office (EPO) The Extended European Search Report for 20791500.0 dated Mar. 17, 2022 7 Pages.

* cited by examiner

|                    | Workbench | Contacts | Customer library |

135 xxxx 6621

2018-7-20 16:17 ↗ 135 xxxx 6221 00:27

2018-7-18 11:10 ↗ 138 xxxx 3321 00:48

2018-7-18 10:40 ↗ 188 xxxx 2891 Canceled call 2018-7-18 10:10 ↗ 138 xxxx 3321 Canceled call 2018-7-17 15:10 ↗ 138 xxxx 3321 Canceled call 2018-7-17 11:10 ↗ 138 xxxx 3321 Canceled call

MEDIA PACKET FORWARDING METHOD, FORWARDING SERVER, AND STORAGE MEDIUM

RELATED APPLICATIONS

This application is a continuation of PCT Application No. PCT/CN2020/081261, entitled "MEDIA PACKET FORWARDING METHOD, FORWARDING SERVER, AND STORAGE MEDIUM" and filed on Mar. 26, 2020, which in turn claims priority to Chinese Patent Application No. 201910303532.5, entitled "MEDIA PACKET FORWARDING METHOD AND FORWARDING SERVER" and filed with the China National Intellectual Property Administration on Apr. 16, 2019. The two applications are incorporated by reference in their entirety.

FIELD OF THE TECHNOLOGY

Embodiments of this application relate to the field of communication technologies, and in particular, to a media packet forwarding method, a forwarding server, and a storage medium.

BACKGROUND OF THE DISCLOSURE

During a voice call between two parties, only a few types of media packets are involved, and there is a strict order among such media packets in the calling process. Therefore, the order and time of arrival of a plurality of types of media packets at a forwarding device may be determined by using a policy control, so that the forwarding device forwards the media packets according to the order. However, in a converged communication service scenario, the service procedure of a voice call is relatively complex, involving not only various different media packets but also frequent alternating uses of different types of media packets.

SUMMARY

One aspect of the present disclosure provides a media packet forwarding method, performed by a forwarding server. The method includes receiving a to-be-forwarded RTP (real-time transport protocol) media packet; determining a type of the to-be-forwarded RTP media packet; determining a priority of the to-be-forwarded RTP media packet according to the type of the to-be-forwarded RTP media packet; and forwarding an RTP media packet having a higher priority, selecting between the received to-be-forwarded RTP media packet and an RTP media packet being currently forwarded.

Another aspect of the present disclosure provides a forwarding server. The server includes a receiving module, configured to receive a to-be-forwarded RTP media packet; an analysis module, configured to determine a type of the to-be-forwarded RTP media packet; a processing module, configured to determine a priority of the to-be-forwarded RTP media packet according to the type of the to-be-forwarded RTP media packet; and a forwarding module, configured to forward an RTP media packet having a higher priority, selecting between the received to-be-forwarded RTP media packet and an RTP media packet being currently forwarded.

An embodiment of this application provides a computing device, including a memory, a processor, and a computer program stored on the memory and executable on the processor, the processor, when executing the program, implementing operations of the media packet forwarding method.

An embodiment of this application provides a non-transitory computer-readable storage medium, storing a computer program executable by a computer device, the program, when run on the computer device, causing the computer device to perform: receiving a to-be-forwarded RTP (real-time transport protocol) media packet; determining a type of the to-be-forwarded RTP media packet; determining a priority of the to-be-forwarded RTP media packet according to the type of the to-be-forwarded RTP media packet; and forwarding an RTP media packet having a higher priority, selecting between the received to-be-forwarded RTP media packet and an RTP media packet being currently forwarded.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

FIG. 2 is a schematic diagram of an interface of a call application according to an embodiment of this application.

DESCRIPTION OF EMBODIMENTS

Figure 1:
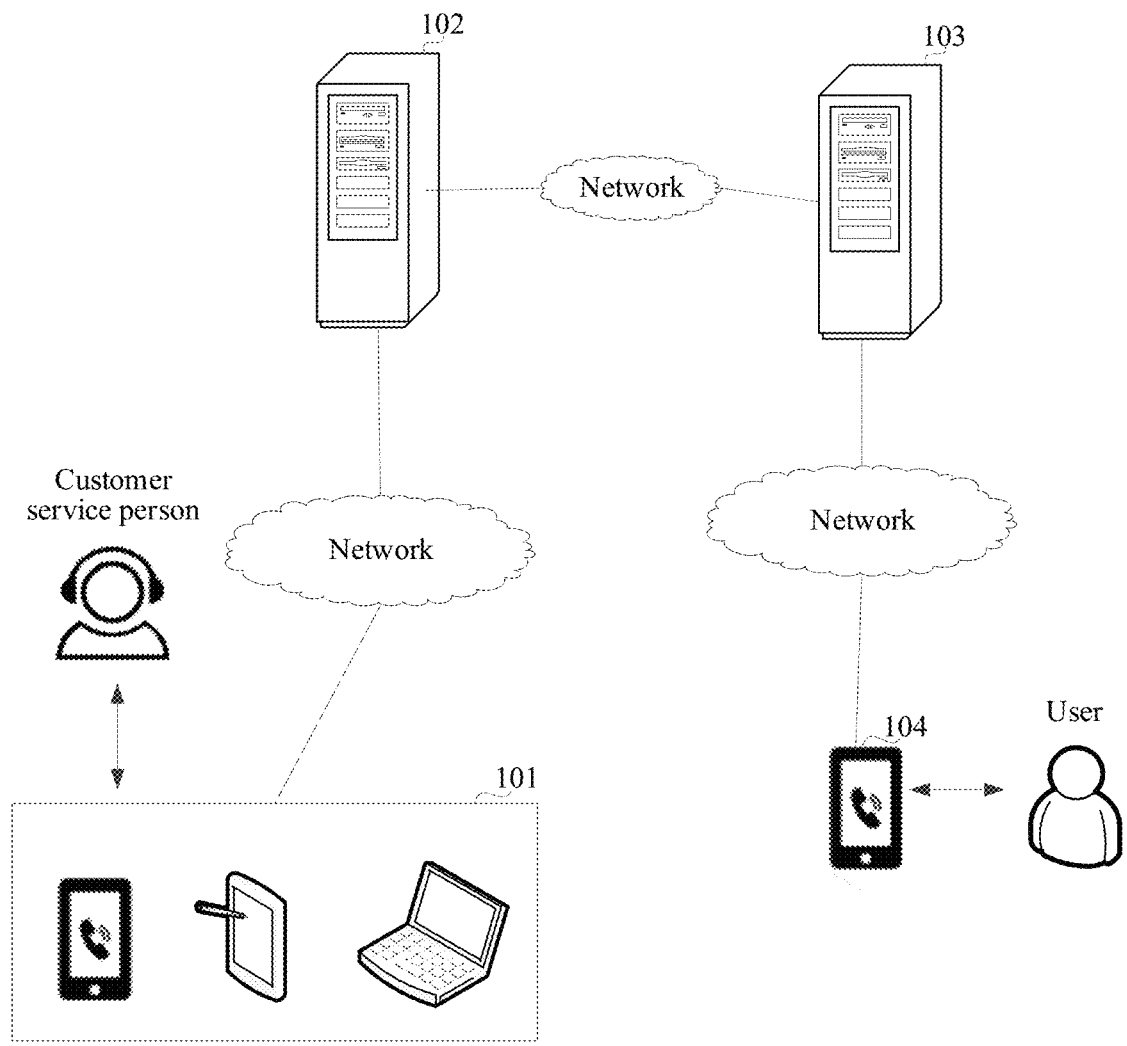
FIG. 1 is a schematic diagram of an application scenario according to an embodiment of this application.

To make the objectives, technical solutions, and advantageous effects of this application clearer, the following further describes this application in detail with reference to the accompanying drawings and the embodiments. It is to be understood that the specific embodiments described herein are merely used to explain this application but are not intended to limit this application.

The following describes terms involved in the embodiments of this application.

Converged communication service refers to a convergence of communication technologies and information technologies. Communication technology services refer to various types of services in a conventional telecommunication network, such as a telephone service, a short message service, a conference phone service, and a call center service. Information technology services refer to various types of IP services, such as instant messaging (IM); video and application sharing, such as video monitoring, information sharing, and a download service; and Internet services, such as an email and a voice email.

Public switched telephone network (PSTN) refers to a common telephone system. It is a telephone network commonly used in our daily life.

RTP is a network transport protocol, which is published in RFC 1889 by a multimedia transport group of IETF (Internet engineering task force) in 1996, and is then updated in RFC 3550.

DTMF is subscriber signaling between telephone sets and switches in a telephone system, and is usually configured to transmit a called number.

RFC 2833 is a mainstream DTMF transmission method. It is an in-band detection method, transmits signaling by using RTP, and marks RFC 2833 data packet by using special rtpPayloadType, that is, TeleponeEvent.

In one example, in a conventional public switched telephone network, there are few calling parties and a small number of types of media packets are involved. For example, during calling between users at two ends of the network, only call media packets and IVR packets are involved. In the calling process, preset policy control is used. That is, IVR voice is played only before a receiving party picks up the phone, and playback of the IVR voice ends after the phone is picked up. Therefore, simultaneous arrival of two-channel media packets at a forwarding device does not occur, so that the forwarding device only needs to forward received media packets. However, in a converged communication service scenario, the service procedure of a voice call is relatively complex, involving a plurality of parties, such as a multi-party telephone conference. A large number of various different media packets are involved. For example, voice media packets such as call voice and IVR voice are included, and non-voice media packets such as DTMF may also be included. Frequent alternating use of different types of media packets exists. A converged communication service platform cannot easily control the order of arrival of all media packets at a forwarding device. In particular, for DTMF, a signal that is triggered on a user side, a user may trigger the signal in the entire calling processing, which has relatively great randomness, and cannot be controlled by using a policy. As such, simultaneous arrival of multi-channel media packets at the forwarding device can happen. Consequently, the forwarding device simultaneously forwards the multi-channel media packets to a receiving party, causing the receiving party unable to hear the sound because the media packets cannot be parsed.

When the multi-channel media packets simultaneously arrive at the forwarding server, the forwarding server directly forwards the media packets without processing, which may cause the receiving party not hear the sound. In view of this, in the embodiments of this application, after receiving a to-be-forwarded RTP media packet, the forwarding server determines a type of the to-be-forwarded RTP media packet, determines a priority of the to-be-forwarded RTP media packet according to the type of the to-be-forwarded RTP media packet, and then gives priority to forwarding an RTP media packet having the highest priority in all received to-be-forwarded RTP media packets, so that the forwarding server forwards only one-channel media packets to a receiving terminal, avoiding the situation in which the receiving terminal cannot hear the sound because multi-channel media packets cannot be parsed.

The media packet forwarding method in the embodiments of this application is applicable to a converged communication service scenario, such as a call center, a multi-party telephone conference, and a video conference. For example, as shown in FIG. 1, a call center scenario includes a call center device 101, a converged communication service platform 102, an operator server 103, and a user terminal 104.

The call center device 101 is an electronic device having a network communication function, and the electronic device may be a smartphone, a tablet computer, a portable personal computer, or the like. A call application is installed on the call center device 101 in advance. A customer service person may tap/click a phone number of a user in a dialing keyboard displayed in the call application, and then tap/click a call button. For example, as shown in FIG. 2, the function of the call application includes a workbench, contacts, and a customer library. When the customer service person taps/clicks a workbench option, a workbench interface is displayed. The workbench interface includes a dialing keyboard and a call record. The customer service person may taps/clicks a dialing keyboard interface to input a phone number of a user, where the workbench interface displays the phone number of the user dialed by the customer service person, and then taps/clicks the call button to call the user. The customer service person may alternatively tap/click a contacts option to query the contacts for a phone number of a user, and then tap/click the phone number of the user in the contacts to call the user.

The call center device 101 transmits a call request carrying the phone number of the user to the converged communication service platform 102, the converged communication service platform 102 transmits the call request to the operator server 103, and the operator server 103 forwards the call request to the user terminal 104 according to the phone number of the user. In the calling process, the converged communication service platform 102 may forward a call voice media stream between the customer service person and the user. The converged communication service platform 102 may further provide an IVR voice service and a DTMF service. The converged communication service platform 102 transmits an IVR voice media stream to the operator server 103, the operator server 103 forwards the IVR voice media stream to the user terminal 104, and IVR voice is played on the user terminal 104. When the user taps different keys according to a prompt of the IVR voice, the converged communication service platform 102 determines a DTMF media stream according to the keys tapped by the user, and then determines to process a next requirement of the user according to the DTMF media stream. The converged communication service platform 102 may be a server, a server cluster formed by several servers, or a cloud computing center. The user terminal 104 may be a smartphone. The call center device 101 is connected to the converged communication service platform 102 by using a wireless network, the converged communication service platform 102 is connected to the operator server 103 by using a wireless network, and the operator server 103 is connected to the user terminal 104 by using a wireless network.

Figure 3:
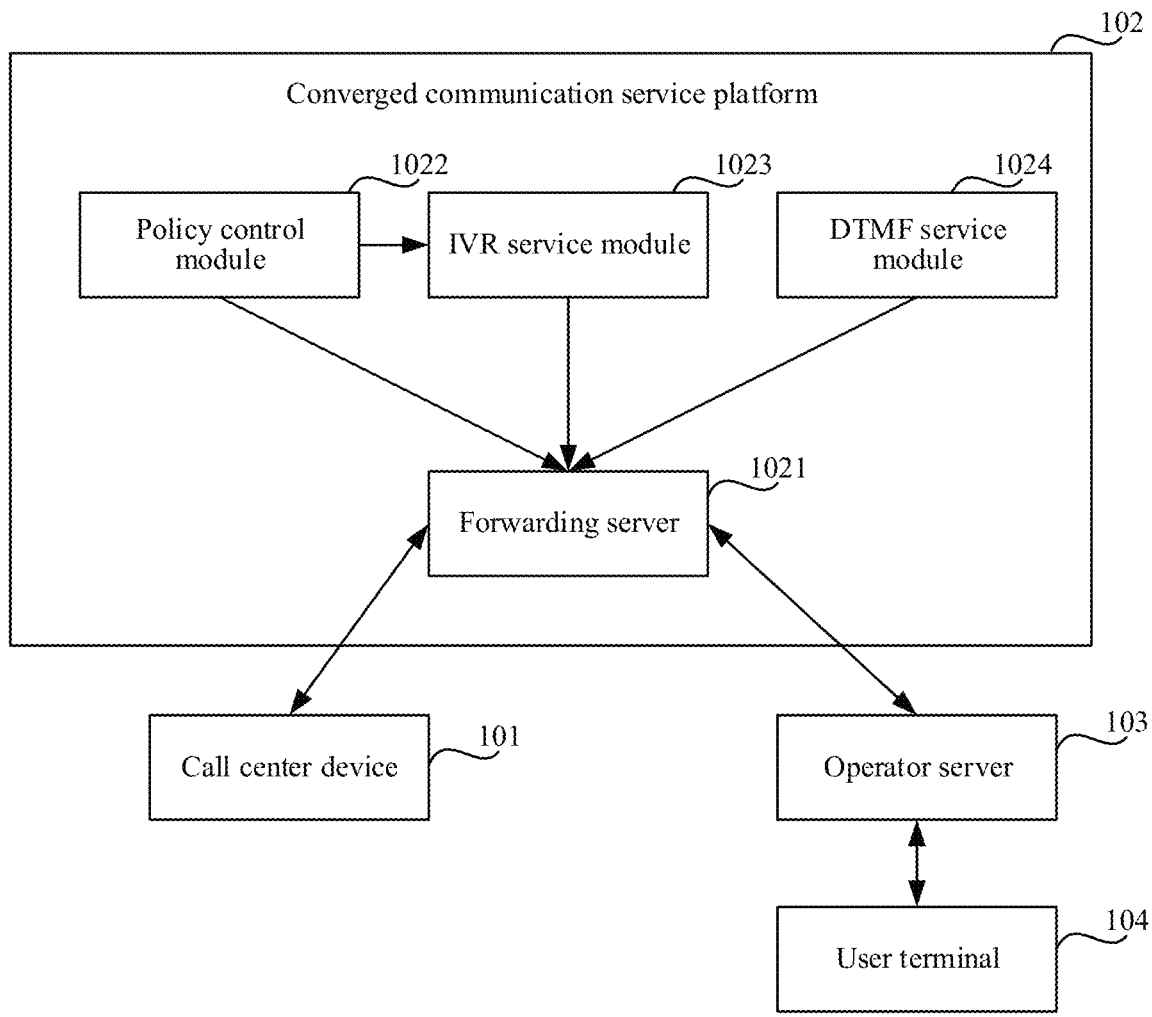
FIG. 3 is a diagram of a system architecture of a converged communication service platform according to an embodiment of this application.

Further, in the diagram of the application scenario shown in FIG. 1, a system architecture of the converged communication service platform 102 is shown in FIG. 3. The converged communication service platform 102 includes a forwarding server 1021, a policy control module 1022, an IVR service module 1023, and a DTMF service module 1024.

The call center device 101 transmits a call voice media stream of the customer service person to the forwarding server 1021. The IVR service module 1023 generates an IVR voice media stream, and transmits the IVR voice media stream to the forwarding server 1021. The DTMF service module 1024 generates a DTMF media stream, and transmits the DTMF media stream to the forwarding server 1021. During establishing of a call, the policy control module 1022 may control an order of arrival of a call voice media stream and an IVR voice media stream at the forwarding server 1021. For example, the IVR voice is first played, and then make a call. However, in the calling process, alternating arrival of the call voice media stream, the IVR voice media stream, and a DTMF signal at the forwarding server 1021 may occur. After simultaneously receiving multi-channel media streams, the forwarding server 1021 forwards a media stream having a highest priority, and discards a media stream having a lower priority, so that the operator server 103 forwards only one-channel media streams to the user terminal 104, avoiding the situation in which the user cannot hear the sound because the user terminal 104 cannot parse the multi-channel media streams.

Figure 4:
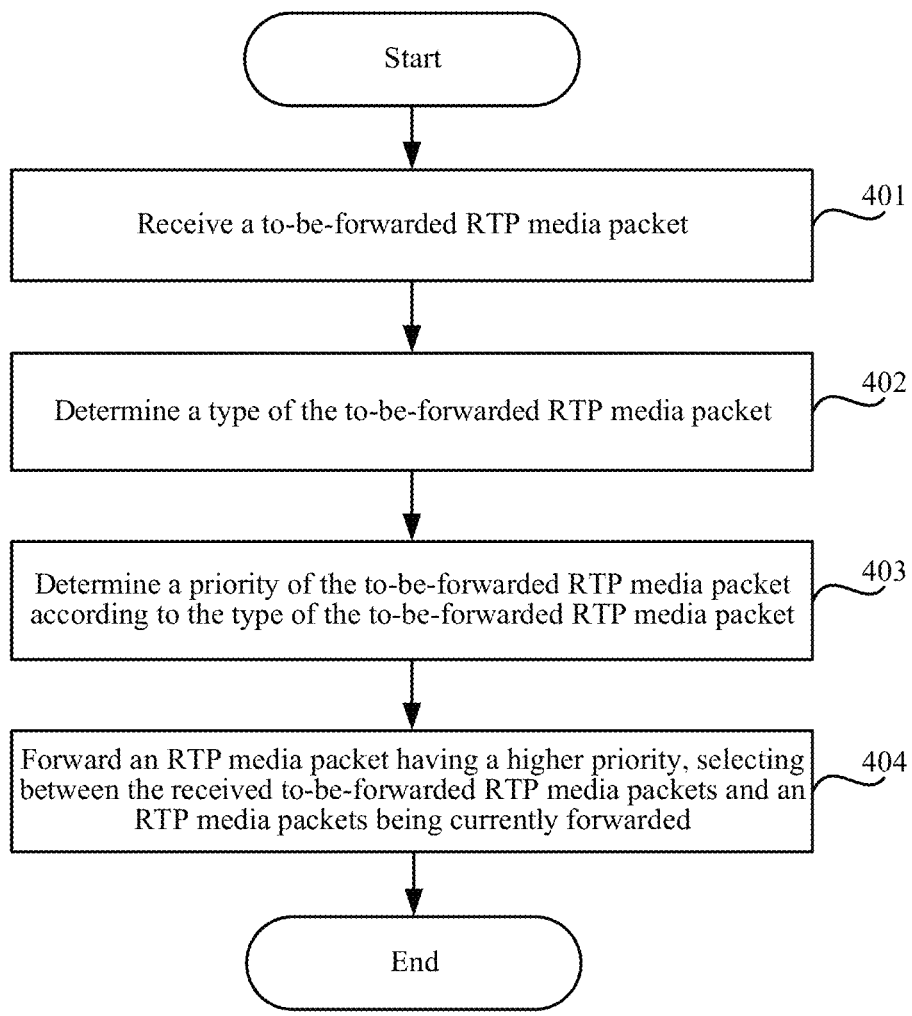
FIG. 4 is a schematic flowchart of a media packet forwarding method according to an embodiment of this application.

Consistent with the diagram of the application scenario shown in FIG. 1 and a schematic diagram of the system architecture of the converged communication service platform shown in FIG. 3, an embodiment of this application provides a procedure of a media packet forwarding method. The procedure of the method may be performed by a forwarding server. As shown in FIG. 4, the method includes the following steps:

Step S401. Receive a to-be-forwarded RTP media packet.

Step S402. Determine a type of the to-be-forwarded RTP media packet.

An RTP media packet is a media packet forwarded by using the RTP protocol. RTP media packets may be classified into different types according to different classification rules. For example, the RTP media packets may be classified into three types: a call voice packet, an IVR voice packet, and a DTMF packet. The RTP media packets may be alternatively classified into two types: a voice packet and a non-voice packet. The RTP media packets may be alternatively classified into two types: a call voice packet and a non-call voice packet.

Step S403. Determine a priority of the to-be-forwarded RTP media packet according to the type of the to-be-forwarded RTP media packet.

In some embodiments, a priority of each type of RTP media packet is preset. For example, when the RTP media packets are classified into three types: a call voice packet, an IVR voice packet, and a DTMF packet, because the IVR voice packet is usually used for controlling a call procedure, the IVR voice packet may be set to a first priority. In the current mainstream RFC 2833 method, a priority of the DTMF packet is higher than that of the call voice packet, so that the DTMF packet may be set to a second priority, and the call voice packet is set to a third priority.

In another example, when the RTP media packets are classified into two types: a voice packet and a non-voice packet, the voice packet may be set to a first priority, and the non-voice packet may be set to a second priority.

In another example, when the RTP media packets are classified into two types: a call voice packet and a non-call voice packet, the call voice packet may be set to a first priority, and the non-call voice packet may be set to a second priority.

After the type of the to-be-forwarded RTP media packet is determined, a priority of the to-be-forwarded RTP media packet may be determined by querying preset priorities according to the type of the to-be-forwarded RTP media packet.

For example, when the RTP media packets are classified into three types: a call voice packet, an IVR voice packet, and a DTMF packet, if the to-be-forwarded RTP media packet is a call voice packet, a type of the to-be-forwarded RTP media packet is a call voice packet, and a priority of the call voice packet may be determined as a third priority according to the type of the to-be-forwarded RTP media packet.

For example, when the RTP media packets are classified into two types: a voice packet and a non-voice packet, if the to-be-forwarded RTP media packet is a voice packet, a type of the to-be-forwarded RTP media packet is a voice packet, and a priority of the voice packet may be determined as a first priority according to the type of the to-be-forwarded RTP media packet.

For example, when the RTP media packets are classified into two types: a call voice packet and a non-call voice packet, if the to-be-forwarded RTP media packet is a call voice packet, a type of the to-be-forwarded RTP media packet is a call voice packet, and a priority of the call voice packet may be determined as a first priority according to the type of the to-be-forwarded RTP media packet.

Step S404. Forward an RTP media packet having a higher priority between the received to-be-forwarded RTP media packet and an RTP media packet being currently forwarded.

In some embodiments, the received to-be-forwarded RTP media packet is discarded when a priority of the RTP media packet being currently forwarded is higher than the priority of the received to-be-forwarded RTP media packet. The priority of the RTP media packet being currently forwarded is indicated by priority indication information. The RTP media packet being currently forwarded is discarded when the priority of the RTP media packet being currently forwarded is lower than the priority of the received to-be-forwarded RTP media packet, and the received to-be-forwarded RTP media packet is forwarded.

In one embodiment, after the forwarding server receives the to-be-forwarded RTP media packet, the forwarding server further includes a to-be-forwarded RTP media packet being currently forwarded. In this case, priorities of the received to-be-forwarded RTP media packet and the RTP media packet being currently forwarded are compared, to determine an RTP media packet having a higher priority. Then, the RTP media packet having the higher priority is forwarded, so that an RTP media packet having a highest priority is forwarded every time.

After receiving multi-channel media packets, the forwarding server gives priority to forwarding an RTP media packet having a highest priority, so that the forwarding server forwards only one-channel media packets to a receiving terminal. Thus, avoiding the situation in which the receiving terminal cannot hear the sound because the multi-channel media packets cannot be parsed. Embodiments of the present application therefore ensure normal operation of a call between users, and improve the user experience.

In some embodiments, in step S402, a type of the to-be-forwarded RTP media packet may be determined by using at least the following three methods in the embodiments of this application.

In one embodiment, the type of the to-be-forwarded RTP media packet is determined according to a PT field and a CSRC field in a packet header of the to-be-forwarded RTP media packet.

Figure 5:
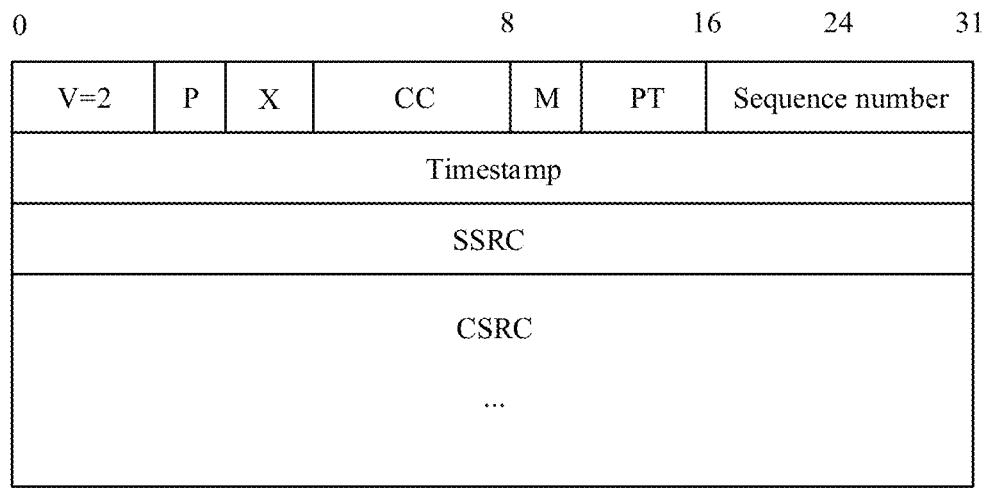
FIG. 5 is a schematic diagram of a packet header of an RTP media packet according to an embodiment of this application.

A format of a packet header of an RTP media packet is shown in FIG. 5. The packet header of the RTP media packet includes a PT field, and a voice packet and a non-voice packet may be distinguished by using a value of the PT field. For example, in a signaling negotiation phase, values of PT fields respectively corresponding to a voice packet and a DTMF packet are determined, and the voice packet and the DTMF packet are distinguished by using the values of the PT fields.

Because voice packets may be subdivided into voice packets of different types. For example, a voice packet includes a call voice packet and an IVR voice packet. The call voice packet and the IVR voice packet use a common value of a PT field, and thus need to be further distinguished. In this embodiment of this application, voice packets of different types are distinguished by using a value of a CSRC field. CSRC is originally used for identifying sources of all RTP media packets contributing to a new packet generated by using an RTP mixer, and the call voice packet does not include the field. Therefore, a call voice packet and a non-call voice packet may be distinguished by using a value of the CSRC field. For example, a CSRC field in an IVR voice packet is defined as CSRC=0xFFFFFFFE, to clearly indicate that one piece of IVR voice already ends, that is, an ending packet is defined, where CSRC=0xFFFFFFFE. Therefore, the call voice packet and the IVR voice packet may be distinguished by using the value of the CSRC field.

Figure 6:
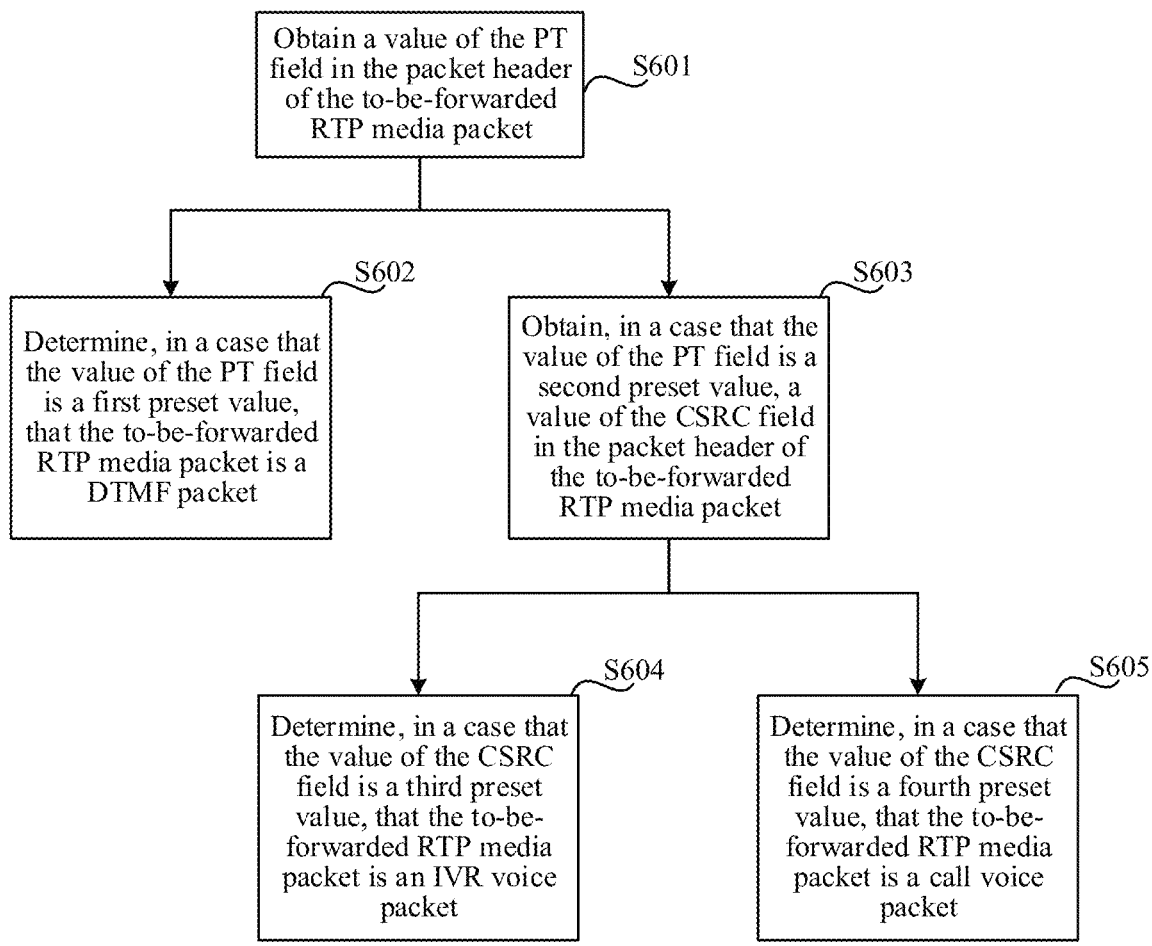
FIG. 6 is a schematic flowchart of determining a type of an RTP media packet according to an embodiment of this application.

For example, as shown in FIG. 6, when a type of an RTP media packet includes a call voice packet, an IVR voice packet, and a DTMF packet, the determining a type of the received to-be-forwarded RTP media packet includes the following steps:

Step S601. Obtain a value of the PT field in the packet header of the to-be-forwarded RTP media packet.

Step S602. Determine, when the value of the PT field is a first preset value, that the to-be-forwarded RTP media packet is a DTMF packet.

Step S603. Obtain, when the value of the PT field is a second preset value, a value of the CSRC field in the packet header of the to-be-forwarded RTP media packet.

Step S604. Determine, when the value of the CSRC field is a third preset value, that the to-be-forwarded RTP media packet is an IVR voice packet.

Step S605. Determine, when the value of the CSRC field is a fourth preset value, that the to-be-forwarded RTP media packet is a call voice packet.

In one embodiment, the type of the to-be-forwarded RTP media packet is determined according to a PT field in a packet header of the to-be-forwarded RTP media packet.

Figure 7:
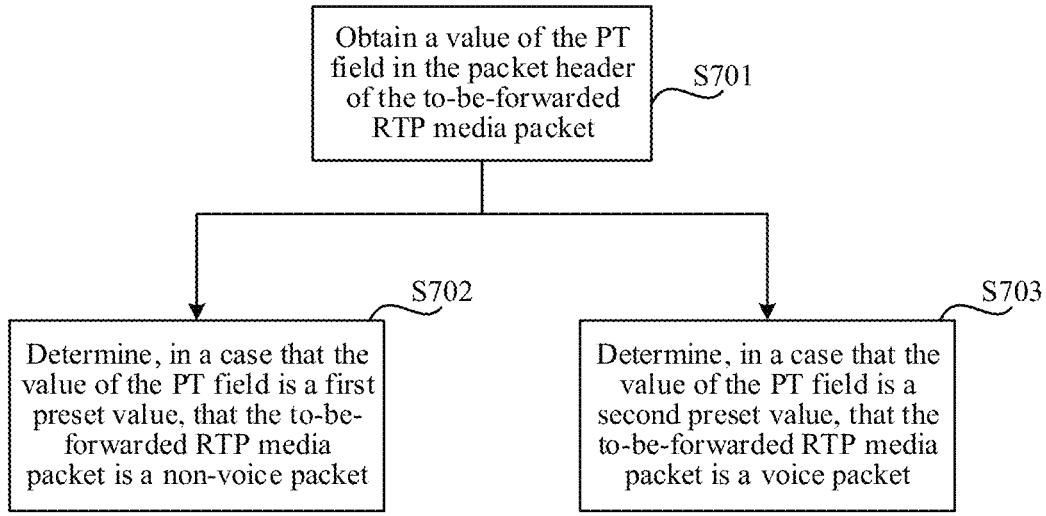
FIG. 7 is a schematic flowchart of determining a type of an RTP media packet according to an embodiment of this application.

When RTP media packets are classified according to a voice packet and a non-voice packet, the type of the to-be-forwarded RTP media packet may be directly determined according to a value of the PT field. For example, as shown in FIG. 7, when a type of an RTP media packet includes a voice packet and a non-voice packet, the determining a type of the received to-be-forwarded RTP media packet includes the following steps:

Step S701. Obtain a value of the PT field in the packet header of the to-be-forwarded RTP media packet.

Step S702. Determine, when the value of the PT field is a first preset value, that the to-be-forwarded RTP media packet is a non-voice packet.

Step S703. Determine, when the value of the PT field is a second preset value, that the to-be-forwarded RTP media packet is a voice packet.

In one embodiment, the type of the to-be-forwarded RTP media packet is determined according to a CSRC field in a packet header of the to-be-forwarded RTP media packet.

Figure 8:
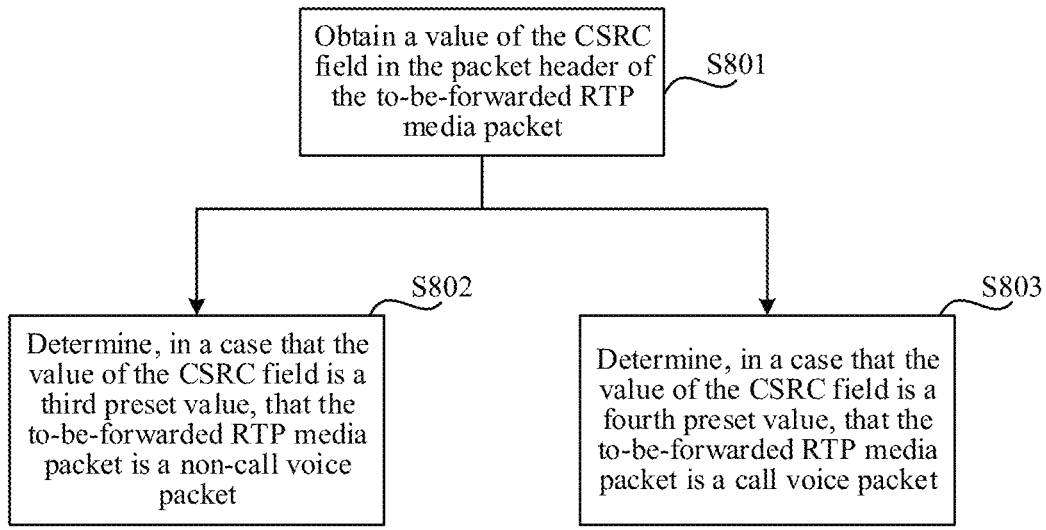
FIG. 8 is a schematic flowchart of determining a type of an RTP media packet according to an embodiment of this application.

When RTP media packets are classified according to a call voice packet and a non-call voice packet, the type of the to-be-forwarded RTP media packet may be directly determined according to a value of the CSRC field. For example, as shown in FIG. 8, when a type of an RTP media packet includes a call voice packet and a non-call voice packet, the determining a type of the to-be-forwarded RTP media packet includes the following steps:

Step S801. Obtain a value of the CSRC field in the packet header of the to-be-forwarded RTP media packet.

Step S802. Determine, when the value of the CSRC field is a third preset value, that the to-be-forwarded RTP media packet is a non-call voice packet.

Step S803. Determine, when the value of the CSRC field is a fourth preset value, that the to-be-forwarded RTP media packet is a call voice packet.

Because media packets are distinguished by using specific fields in packet headers of the media packets, after receiving a to-be-forwarded media packet, the forwarding server may determine a type of the to-be-forwarded media packet according to a value of a specific field in a packet header of the to-be-forwarded media packet, and further determine a priority of the to-be-forwarded media packet, to facilitate in subsequently determining a media packet that is to be forwarded according to the priority of the to-be-forwarded media packet.

In some embodiments, in step S404, the forwarding server may forward an RTP media packet having a higher priority in the received to-be-forwarded RTP media packet and an RTP media packet being currently forwarded according to the following rules:

When a priority of the RTP media packet being currently forwarded is higher than the priority of the received to-be-forwarded RTP media packet, the received to-be-forwarded RTP media packet is discarded.

For example, a priority of an IVR voice packet is higher than a priority of a DTMF packet. If the RTP media packet being currently forwarded is an IVR voice packet, and the received to-be-forwarded RTP media packet is a DTMF packet, the received DTMF packet is discarded.

When the priority of the RTP media packet being currently forwarded is lower than the priority of the received to-be-forwarded RTP media packet, the RTP media packet being currently forwarded is discarded, and the received to-be-forwarded RTP media packet is forwarded.

For example, a priority of a DTMF packet is higher than a priority of a call voice packet. If the RTP media packet being currently forwarded is a call voice packet, and the received to-be-forwarded RTP media packet is a DTMF packet, the call voice packet being currently forwarded is discarded, and the received DTMF packet is forwarded.

For example, when the forwarding server is in an initial state currently, and the received to-be-forwarded RTP media packet is a call voice packet, the received call voice packet is forwarded.

Because after receiving a to-be-forwarded media packet, the forwarding server determines a media packet that is given priority to forwarding according to priorities of a media packet being forwarding and the received to-be-forwarded media packet, so that the forwarding server forwards only one-channel media packets, avoiding that the user terminal cannot hear the sound because the user terminal cannot parse received multi-channel media packets.

In some embodiments, before determining a priority relationship between the media packet being forwarding and the received to-be-forwarded media packet, the forwarding server may determine a priority of the RTP media packet being currently forwarded according to priority indication information, the priority indication information being used for indicating the priority of the RTP media packet being currently forwarded. For example, when the forwarding server is forwarding an IVR voice packet, current priority indication information of the forwarding server indicates a priority of the IVR voice packet. When the forwarding server is in an initial state, current priority indication information of the forwarding server indicates a priority of the initial state. Generally, the priority of the initial state is a lowest priority.

If the RTP media packet being currently forwarded by the forwarding server changes, the priority indicated by the current priority indication information of the forwarding server is updated accordingly.

In one embodiment, when the priority of the RTP media packet being currently forwarded is lower than the priority of the received to-be-forwarded RTP media packet, the forwarding server discards the RTP media packet being currently forwarded, forwards the received to-be-forwarded RTP media packet, and updates the priority indication information according to the priority of the received to-be-forwarded RTP media packet.

For example, if the RTP media packet being currently forwarded is a call voice packet, and the received to-be-forwarded RTP media packet is a DTMF packet, the call voice packet is discarded, the DTMF packet is forwarded, and the current priority indication information of the forwarding server is updated to indicate the priority of the DTMF packet.

For example, if the current priority indication information of the forwarding server indicates the priority of the initial state, and the received to-be-forwarded RTP media packet is a call voice packet, the current priority indication information of the forwarding server is updated to indicate the priority of the call voice packet.

In some embodiments, when the priority of the RTP media packet being currently forwarded is higher than the priority of the received to-be-forwarded RTP media packet, the received to-be-forwarded RTP media packet is discarded, and the RTP media packet being forwarded continues to be forwarded. Because the RTP media packet being forwarded does not change, the priority indication information is not updated.

For example, if the RTP media packet being currently forwarded is an IVR voice packet, and the received to-be-forwarded RTP media packet is a DTMF packet, the priority indication information is not updated.

The priority indication information of the forwarding server is set to be used for indicating the priority of the RTP media packet being forwarded. Therefore, after receiving a to-be-forwarded media packet, the forwarding server may quickly determine a priority of an RTP media packet being currently forwarded according to the priority indication information, and further compare the priority of the RTP media packet being currently forwarded to a priority of the received to-be-forwarded RTP media packet, to determine an RTP media packet that is given priority to forwarding, and to improve the efficiency of forwarding media packets.

In some embodiments, when the priority of the RTP media packet being currently forwarded by the forwarding server is higher than the priority of received to-be-forwarded RTP media packet, the priority indication information is not updated. Therefore, after forwarding of the RTP media packet being currently forwarded ends, to avoid that after a to-be-forwarded RTP media packet having a priority lower than the priority indicated by the current priority indication information is received, the received to-be-forwarded RTP media packets is still discarded, the priority indicated by the priority indication information needs to be lowered. In view of this, the embodiments of this application provide at least two methods of lowering the priority indicated by the priority indication information.

In one embodiment, a quantity of received to-be-forwarded RTP media packets that are discarded is accumulated, the priority indicated by the priority indication information is lowered when the accumulated quantity is greater than a preset threshold, and a quantity of received to-be-forwarded RTP media packets that are discarded is re-accumulated.

In some embodiments, the lowering the priority indicated by the priority indication information when the accumulated quantity is greater than a preset threshold may include: adjusting the priority indicated by the priority indication information to a lowest priority, or a priority lower than the current priority indicated by the priority indication information, or a priority of a currently received to-be-forwarded RTP media packet.

In one embodiment, when the priority of the RTP media packet being currently forwarded is higher than the priority of the received to-be-forwarded RTP media packet, the received to-be-forwarded RTP media packet is discarded, and the accumulated value is increased by 1. The rest is deduced by analogy. When the accumulated value is greater than a preset threshold, the priority indicated by the priority indication information may be adjusted to a priority lower than the current priority. Alternatively, the priority indicated by the priority indication information may be adjusted to a lowest priority. Alternatively, the priority indicated by the priority indication information may be adjusted to another preset priority, for example, a priority of a currently received to-be-forwarded RTP media packet.

For example, an RTP media packet may include four priorities, which are sorted in descending order of the priorities, and are respectively a first priority, a second priority, a third priority, and a fourth priority. The current priority indication information indicates the first priority. When the accumulated value is greater than a preset threshold, the priority indication information may be updated to indicate the second priority. Alternatively, the priority indication information may be updated to indicate the fourth priority. Alternatively, the priority indication information may be updated to indicate the third priority. When the priority of the RTP media packet being currently forwarded is higher than the priority of the received to-be-forwarded RTP media packet, the received to-be-forwarded RTP media packet is discarded, and a quantity of received to-be-forwarded RTP media packets that are discarded is accumulated. When the accumulated value is greater than a preset threshold, the priority indicated by the priority indication information is lowered. Therefore, when an ending packet of a media stream being currently forwarded is lost, the priority indicated by the priority indication information can be still lowered, avoiding that forwarding of a media packet having a low priority is affected because the priority indication information always indicates a high priority.

In one embodiment, when the received to-be-forwarded RTP media packet includes a session end identifier, the priority indicated by the priority indication information to a lowest priority.

After forwarding of a string of media stream ends, an RTP media packet carrying a session end identifier identifies the end of forwarding of the media stream. For example, an IVR voice packet defines an ending packet, and a session end identifier CSRC=0xFFFFFFFF. When an IVR voice packet received by the forwarding server includes a session end identifier CSRC=0xFFFFFFFF, the priority indicated by the current priority indication information is adjusted to a lowest priority. When the received to-be-forwarded RTP media packet includes a session end identifier, it indicates that forwarding of the media packet being currently forwarded. In this case, the priority indicated by the priority indication information is adjusted to a lowest priority, to facilitate smooth forwarding of a media packet of another type.

In some embodiments, in step S404, when the priority of the RTP media packet being currently forwarded is equal to the priority of the received to-be-forwarded RTP media packet, the embodiments of this application provide at least the following two methods of forwarding an RTP media packet.

In one embodiment, when the priority of the RTP media packet being currently forwarded is equal to the priority of the received to-be-forwarded RTP media packet and the RTP media packet being currently forwarded and the received to-be-forwarded RTP media packet correspond to different source terminals, the RTP media packet being currently forwarded and the received to-be-forwarded RTP media packet are mixed, and the mixed RTP media packets are forwarded to a receiving terminal.

For example, RTP media packets may be classified into two types: a voice packet and a non-voice packet. If the to-be-forwarded RTP media packet is an IVR voice packet, and the RTP media packet being currently forwarded is a call voice packet, both types of the RTP media packet being currently forwarded and the received to-be-forwarded RTP media packet are voice packets, and priorities of the two are priorities corresponding to the voice packets. Because the IVR voice packet and the call voice packet corresponding to different source terminals, the two are two-channel RTP media packets. Therefore, the IVR voice packet and the call voice packet are mixed into one-channel RTP media packets, and then the mixed one-channel RTP media packets are forwarded to a receiving terminal. In this case, the receiving terminal may simultaneously hear IVR voice and call voice.

For example, RTP media packets may be classified into three types: a call voice packet, an IVR voice packet, and a DTMF packet. If the to-be-forwarded RTP media packet is a call voice packet A transmitted by a user terminal 1, and the RTP media packet being currently forwarded is a call voice packet B transmitted by a user terminal 2, both types of the RTP media packet being currently forwarded and the received to-be-forwarded RTP media packet are call voice packets, and both priorities of the two are priorities corresponding to the call voice packets. Because a source terminal corresponding to the call voice packet A is the user terminal 1, and a source terminal corresponding to the call voice packet B is the user terminal 2, the call voice packet A and the call voice packet B are two-channel RTP media packets. Therefore, the call voice packet A and the call voice packet B are mixed into one-channel RTP media packets, and then the mixed one-channel RTP media packets are forwarded to a receiving terminal. In this case, the receiving terminal may simultaneously hear that a user of the user terminal 1 and a user of the user terminal 2 are speaking.

In one embodiment, when the priority of the RTP media packet being currently forwarded is equal to the priority of the received to-be-forwarded RTP media packet and the RTP media packet being currently forwarded and the received to-be-forwarded RTP media packet correspond to the same source terminal, after forwarding of the RTP media packet being currently forwarded ends, the received to-be-forwarded RTP media packet is forwarded.

For example, RTP media packets may be classified into three types: a call voice packet, an IVR voice packet, and a DTMF packet. If the to-be-forwarded RTP media packet is a call voice packet A transmitted by a user terminal 1, and the RTP media packet being currently forwarded is a call voice packet B transmitted by a user terminal 1, both types of the RTP media packet being currently forwarded and the received to-be-forwarded RTP media packet are call voice packets, and both priorities of the two are priorities corresponding to the call voice packets. Because both the source terminals corresponding to the call voice packet A and the call voice packet B are the user terminal 1, the two voice packets are one-channel RTP media packets. Therefore, the call voice packet B is first forwarded to a receiving terminal, and the call voice packet A is then forwarded to the receiving terminal. In this case, the receiving terminal may hear that a user of the user terminal 1 is speaking.

When RTP media packets of different channels that have the same priority occur, the RTP media packets of different channels that have the same priority are mixed, avoiding that a problem that the RTP media packets of different channels that have the same priority are directly forwarded to a user terminal, causing that the user terminal cannot parse multi-channel media packets.

To better explain the embodiments of this application, a media packet forwarding method provided in an embodiment of this application is described below with reference to a specific implementation scenario, and the method is performed by a forwarding server. RTP media packets may be classified into a call voice packet, an IVR voice packet, and a DTMF packet, where a priority of the IVR voice packet is higher than a priority of the DTMF packet, and the priority of the DTMF packet is higher than a priority of the call voice packet. The forwarding server includes a first state, a second state, a third state, and a fourth state. The first state indicates an initial state. The second state indicates that a call voice packet is forwarding, and current priority indication information of the forwarding server indicates a priority of the call voice packet. The third state indicates that a DTMF packet is forwarding, and current priority indication information of the forwarding server indicates a priority of the DTMF packet. The fourth state indicates that an IVR voice packet is forwarding, and current priority indication information of the forwarding server indicates a priority of the IVR voice packet. A type of a to-be-forwarded RTP media packet is determined according to a value of a PT field and a value of a CSRC field in a packet header of the to-be-forwarded RTP media packet. In the four states, the forwarding server uses different processing methods according to different priorities of the received to-be-forwarded RTP media packet.

Figure 9:
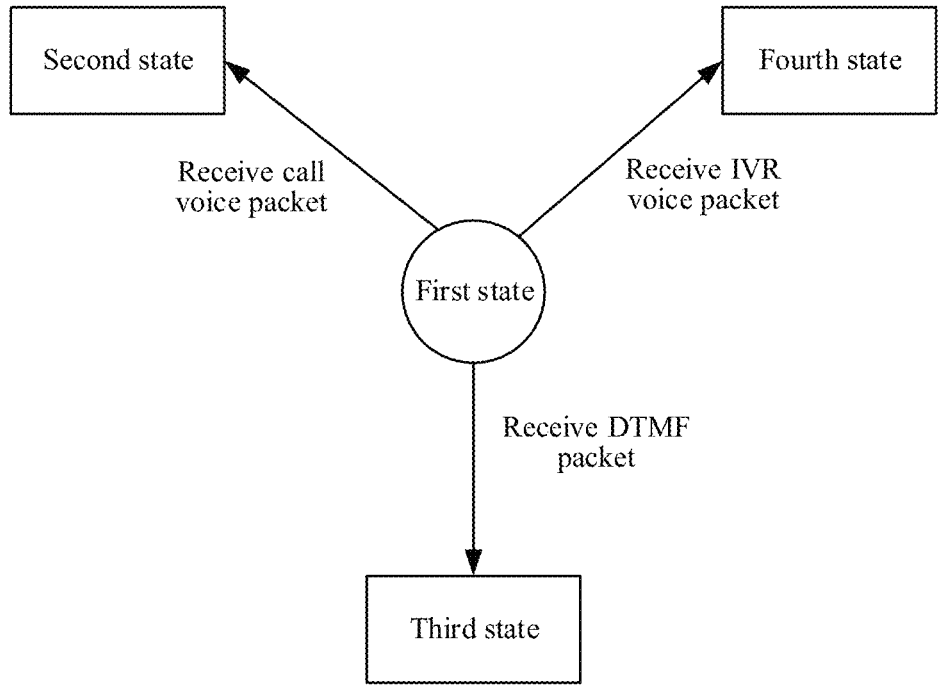
FIG. 9 is a schematic flowchart of a media packet forwarding method according to an embodiment of this application.

As shown in FIG. 9, a current state of the forwarding server is the first state. When receiving an IVR voice packet, the forwarding server switches from the first state to the fourth state, updates the current priority indication information to indicate a priority of the IVR voice packet, and forwards the IVR voice packet. When receiving a DTMF packet, the forwarding server switches from the first state to the third state, updates the current priority indication information to indicate a priority of the DTMF packet, and forwards the DTMF packet. When receiving a call voice packet, the forwarding server switches from the first state to the second state, updates the current priority indication information to indicate a priority of the call voice packet, and forwards the call voice packet.

Figure 10:
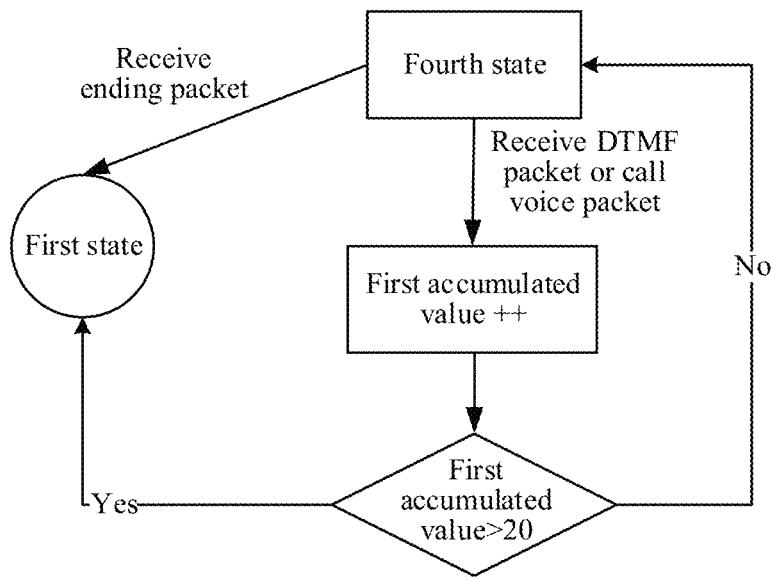
FIG. 10 is a schematic flowchart of a media packet forwarding method according to an embodiment of this application.

As shown in FIG. 10, a current state of the forwarding server is the fourth state. When receiving a DTMF packet, because a priority of the DTMF packet is lower than a priority of an IVR voice packet, the received DTMF packet is discarded, and a first accumulated value is increased by 1. Whether the first accumulated value is greater than a first preset threshold is determined, where the first preset threshold is set to 20. If the first accumulated value is greater than the first preset threshold, the forwarding server switches from the fourth state to the first state, updates the current priority indication information to indicate a priority of an initial state. If the first accumulated value is not greater than the first preset threshold, the IVR voice packet continues to be forwarded. When receiving a call voice packet, because a priority of the call voice packet is lower than a priority of an IVR voice packet, the received call voice packet is discarded, and a first accumulated value is increased by 1. Whether the first accumulated value is greater than a first preset threshold is determined, where the first preset threshold is set to 20. If the first accumulated value is greater than the first preset threshold, the forwarding server switches from the fourth state to the first state, updates the current priority indication information to indicate a priority of an initial state. If the first accumulated value is not greater than the first preset threshold, the IVR voice packet continues to be forwarded. When receiving an ending packet, the forwarding server switches from the fourth state to the first state, updates the current priority indication information to indicate a priority of an initial state.

Figure 11:
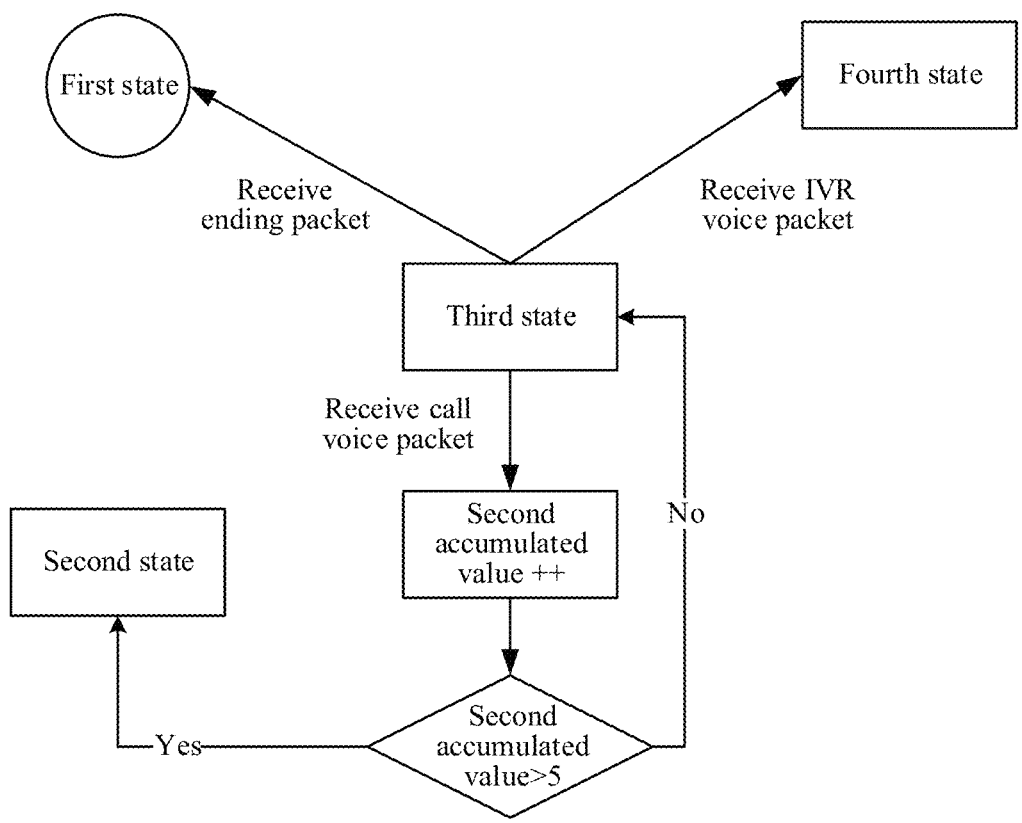
FIG. 11 is a schematic flowchart of a media packet forwarding method according to an embodiment of this application.

As shown in FIG. 11, a current state of the forwarding server is the third state. When receiving an IVR voice packet, because a priority of the IVR voice packet is higher than a priority of a DTMF packet, the forwarding server switches from the third state to the fourth state, updates the current priority indication information to indicate the priority of the IVR voice packet, discards the DTMF packet being forwarded, and forwards the IVR voice packet. When receiving a call voice packet, because a priority of the call voice packet is lower than a priority of a DTMF packet, the received call voice packet is discarded, and a second accumulated value is increased by 1. Whether the second accumulated value is greater than a second preset threshold is determined, where the second preset threshold is set to 5. If the second accumulated value is greater than the second preset threshold, the forwarding server switches from the third state to the second state, updates the current priority indication information to indicate the priority of the call voice packet. If the second accumulated value is not greater than the second preset threshold, the DTMF packet continues to be forwarded. When receiving an ending packet, the forwarding server switches from the third state to the first state, updates the current priority indication information to indicate a priority of an initial state.

Figure 12:
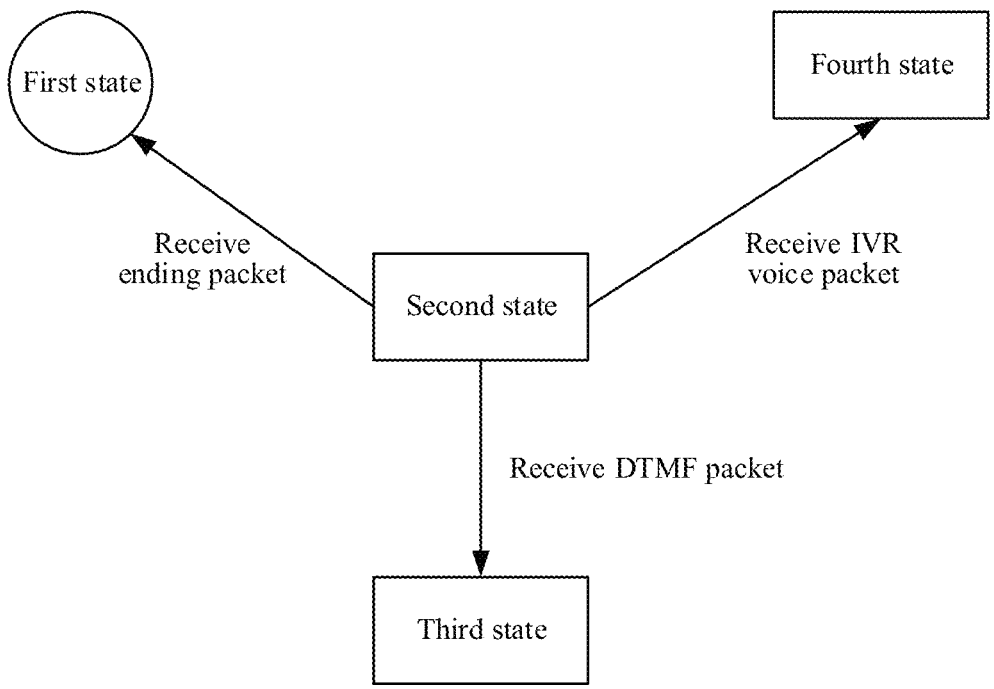
FIG. 12 is a schematic flowchart of a media packet forwarding method according to an embodiment of this application.

As shown in FIG. 12, a current state of the forwarding server is the second state. When receiving an IVR voice packet, because a priority of the IVR voice packet is higher than a priority of a call voice packet, the forwarding server switches from the second state to the fourth state, updates the current priority indication information to indicate the priority of the IVR voice packet, discards the call voice packet being forwarded, and forwards the IVR voice packet. When receiving a DTMF packet, because a priority of the DTMF packet is higher than a priority of a call voice packet, the forwarding server switches from the second state to the third state, updates the current priority indication information to indicate the priority of the DTMF packet, discards the call voice packet being forwarded, and forwards the DTMF packet. When receiving an ending packet, the forwarding server switches from the second state to the first state, updates the current priority indication information to indicate a priority of an initial state.

After receiving multi-channel media packets, the forwarding server gives priority to forwarding an RTP media packet having the highest priority in all received to-be-forwarded RTP media packets, so that the forwarding server forwards only one-channel media packets to a receiving terminal. Embodiments of the present application avoid the scenario in which the receiving terminal cannot hear the sound because the multi-channel media packets cannot be parsed, ensuring that important media packets are given priority to forwarding. Embodiments of the present application ensure normal operation of a call between users, and improve the user experience.

Figure 13:
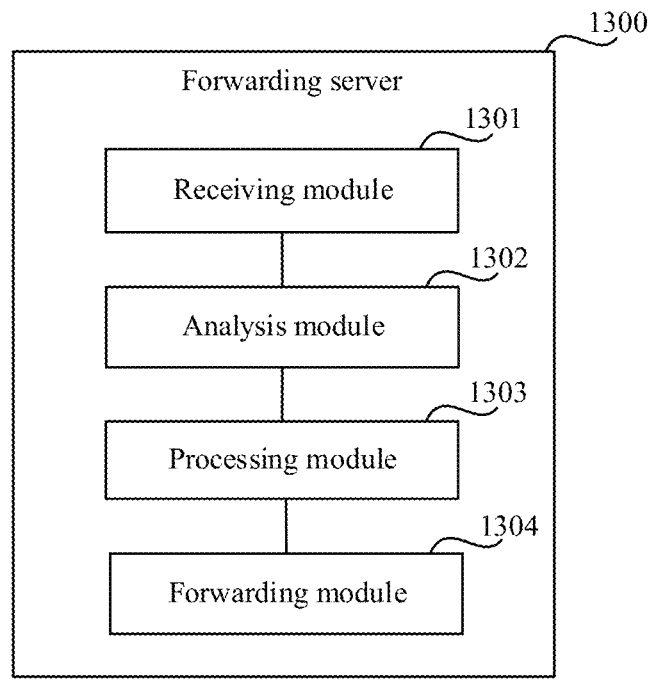
FIG. 13 is a schematic structural diagram of a forwarding server according to an embodiment of this application.

Consistent with the same technical concept, an embodiment of this application provides a forwarding server. As shown in FIG. 13, the forwarding server 1300 includes a receiving module 1301, configured to receive a to-be-forwarded RTP media packet; an analysis module 1302, configured to determine a type of the to-be-forwarded RTP media packet; a processing module 1303, configured to determine a priority of the to-be-forwarded RTP media packet according to the type of the to-be-forwarded RTP media packet; and a forwarding module 1304, configured to forward an RTP media packet having a higher priority in the received to-be-forwarded RTP media packet and an RTP media packet being currently forwarded.

In some embodiments, the forwarding module 1304 is configured to discard the received to-be-forwarded RTP media packet when a priority of the RTP media packet being currently forwarded is higher than the priority of the received to-be-forwarded RTP media packet, the priority of the RTP media packet being currently forwarded being indicated by priority indication information; and discard the RTP media packet being currently forwarded when the priority of the RTP media packet being currently forwarded is lower than the priority of the received to-be-forwarded RTP media packet, and forward the received to-be-forwarded RTP media packet.

In some embodiments, the forwarding module 1304 is further configured to update the priority indication information according to the priority of the received to-be-forwarded RTP media packet when the priority of the RTP media packet being currently forwarded is lower than the priority of the received to-be-forwarded RTP media packet.

In some embodiments, the forwarding module 1304 is further configured to accumulate a quantity of received to-be-forwarded RTP media packets that are discarded; and lower the priority indicated by the priority indication information when the accumulated quantity is greater than a preset threshold, and re-accumulate a quantity of received to-be-forwarded RTP media packets that are discarded.

In some embodiments, the forwarding module is further configured to: adjust the priority indicated by the priority indication information to a lowest priority, or a priority lower than the current priority indicated by the priority indication information, or a priority of a currently received to-be-forwarded RTP media packet.

In some embodiments, the forwarding module 1304 is further configured to adjust the priority indicated by the priority indication information to a lowest priority when the received to-be-forwarded RTP media packet includes a session end identifier.

In some embodiments, the forwarding module 1304 is further configured to:

mix the RTP media packet being currently forwarded and the received to-be-forwarded RTP media packet when the priority of the RTP media packet being currently forwarded is equal to the priority of the received to-be-forwarded RTP media packet and the RTP media packet being currently forwarded and the received to-be-forwarded RTP media packet correspond to different source terminals; and forward the mixed RTP media packets to a receiving terminal.

In some embodiments, the analysis module 1302 is configured to determine the type of the to-be-forwarded RTP media packet according to a PT field and a CSRC field in a packet header of the to-be-forwarded RTP media packet.

In some embodiments, a type of an RTP media packet includes at least a call voice packet, an IVR voice packet, and a DTMF packet; and the analysis module 1302 is configured to obtain a value of the PT field in the packet header of the to-be-forwarded RTP media packet; determine, when the value of the PT field is a first preset value, that the to-be-forwarded RTP media packet is a DTMF packet; obtain, when the value of the PT field is a second preset value, a value of the CSRC field in the packet header of the to-be-forwarded RTP media packet; determine, when the value of the CSRC field is a third preset value, that the to-be-forwarded RTP media packet is an IVR voice packet; and determine, when the value of the CSRC field is a fourth preset value, that the to-be-forwarded RTP media packet is a call voice packet.

Figure 14:
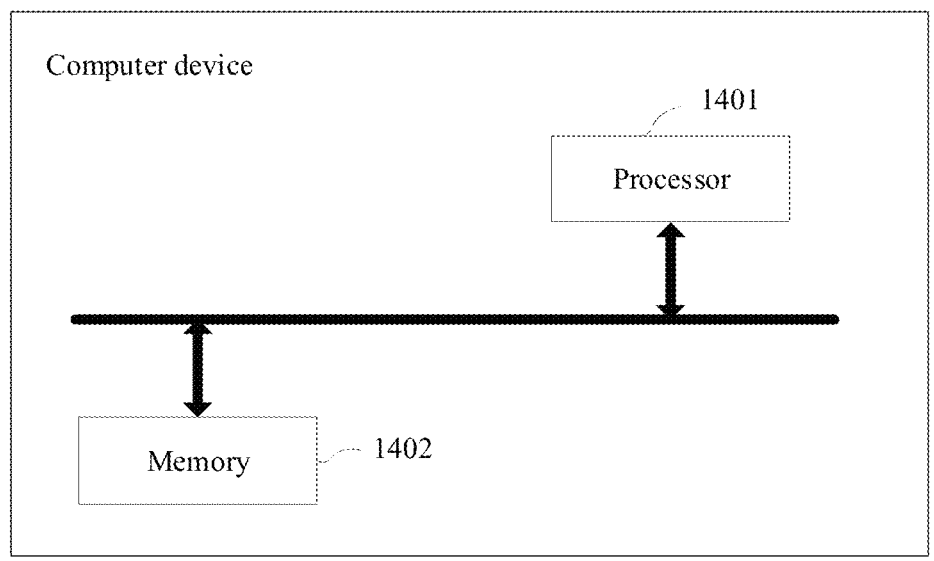
FIG. 14 is a schematic structural diagram of a computing device according to an embodiment of this application.

Consistent with the same technical concept, an embodiment of this application provides a computing device. As shown in FIG. 14, the computing device includes at least one processor 1401, and a memory 1402 connected to the at least one processor. In this embodiment of this application, a specific connection medium between the processor 1401 and the memory 1402 is not limited. In FIG. 14, for example, the processor 1401 is connected to the memory 1402 by using a bus. The bus may be classified into an address bus, a data bus, a control bus, or the like.

In this embodiment of this application, the memory 1402 stores instructions that executable by the at least one processor 1401. The at least one processor 1401 may perform operations included in the media packet forwarding method by executing the instructions stored in the memory 1402.

The processor 1401 is a control center of the computing device, which may be connected to various parts of a terminal device by using various interfaces and lines, and by running or executing the instructions stored in the memory 1402 and invoking data stored in the memory 1402, to forward media packets. The processor 1401 may include one or more processing units. The processor 1401 may integrate an application processor and a modem processor. The application processor mainly processes an operating system, a user interface, an application, and the like. The modem processor mainly processes wireless communication. It may be understood that the modem processor may alternatively not be integrated into the processor 1401. In some embodiments, the processor 1401 and the memory 1402 may be implemented in the same chip. In some embodiments, they may be separately implemented in independent chips.

The processor 1401 may be a general purpose processor, such as a central processing unit (CPU), a digital signal processor, an application-specific integrated circuit (ASIC), a field programmable gate array or another programmable logic device, a discrete gate or a transistor logic device, or a discrete hardware component, and may implement or perform the methods, steps, and logical block diagrams disclosed in the embodiments of this application. The general purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

The memory 1402, as a non-volatile computer-readable storage medium, may be configured to store a non-volatile software program, a non-volatile computer-executable program and a module. The memory 1402 may include at least one type of storage medium. For example, the memory may include a flash memory, a hard disk, a multimedia card, a card type memory, a random access memory (RAM), a static RAM (SRAM), a programmable read-only memory (PROM), a read-only memory (PROM), an electrically erasable programmable ROM (EEPROM), a magnetic memory, a magnetic disk, and an optical disc. Alternatively, the memory 1402 is any other medium that can be used to carry or store expected program code that has an instruction or data structure form, and that can be accessed by a computer, but is not limited thereto. The memory 1402 according to this embodiment of this application may be further a circuit or any other apparatus that can implement a storage function, and is configured to store program instructions and/or data.

Consistent with the same technical concept, an embodiment of this application provides a computer-readable storage medium, storing a computer program executable by a computer device, the program, when run on the computer device, causing the computer device to perform operations of the media packet forwarding method.

A person skilled in the art is to understand that the embodiments of this application may be provided as a method or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to the embodiments of this application. It is to be understood that computer program instructions can implement each procedure and/or block in the flowcharts and/or block diagrams and a combination of procedures and/or blocks in the flowcharts and/or block diagrams. These computer program instructions may be provided to a computer or a processor (e.g., an embedded processor or a processor of another programmable data processing device) to create a machine, so that a machine or apparatus configured to implement functions specified in one or more procedures in the flowcharts and/or one or more blocks in the block diagrams is created by using instructions executed by the computer or the processor.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

The term module, and other similar terms such as unit, subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Although exemplary embodiments of this application have been described, once persons skilled in the art know the basic creative concept, they can make additional changes and modifications to these embodiments. Therefore, the following claims are intended to be construed as to cover the exemplary embodiments and all changes and modifications falling within the scope of this application.

Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A media packet forwarding method, performed by a forwarding server, the method comprising:
   receiving a RTP (real-time transport protocol) media packet;
   determining a type of the received RTP media packet;
   determining a priority of the received RTP media packet according to the type of the received RTP media packet;
   determining an RTP media packet having a higher priority among the received RTP media packet and an RTP media packet being currently forwarded, and forwarding the determined RTP media packet having the higher priority, wherein RTP media packets are classified into three types: a call voice packet, an interactive voice response (IVR) voice packet, and a dual-tone multi-frequency (DTMF) packet, a priority of the IVR packet is higher than a priority of the DTMF packet, and the priority of the DTMF packet is higher than a priority of the call voice packet; and
   operating in a first state indicating an initial state, a second state indicating that the RTP media packet being currently forwarded is the call voice packet, a third state indicating that the RTP media packet being currently forwarded is the DTMP voice packet, and a fourth state indicating that the RTP media packet being currently forwarded is the IVR voice packet.

2. The method according to claim 1, wherein a priority of the RTP media packet being currently forwarded is indicated by priority indication information stored in the forwarding server, and the method further comprises:
   discarding an RTP media packet having a lower priority among the received RTP media packet and the RTP media packet being currently forwarded.

3. The method according to claim 2, further comprising:
   adjusting the priority indication information according to the priority of the received RTP media packet when the priority of the RTP media packet being currently forwarded is lower than the priority of the received RTP media packet.

4. The method according to claim 2, wherein the method further comprises:
   discarding a plurality of received RTP media packets in response to priorities of the plurality of received RTP media packets being lower than the priority of the RTP media packet being currently forwarded, and accumulating a discarding quantity of the plurality of received RTP media packets that are discarded; and
   lowering the priority indicated by the priority indication information when the accumulated discarding quantity is greater than a threshold, resetting the discarding quantity to 0 and re-accumulating the discarding quantity of received RTP media packets that are discarded.

5. The method according to claim 4, wherein the lowering the priority indicated by the priority indication information when the accumulated discarding quantity is greater than the threshold comprises:
   adjusting the priority indicated by the priority indication information to a lowest priority, or a priority lower than the current priority indicated by the priority indication information, or the priority of the currently received RTP media packet.

6. The method according to claim 2, further comprising:
   adjusting the priority indicated by the priority indication information to a lowest priority when the received RTP media packet comprises a session end identifier.

7. The method according to claim 2, further comprising:
   mixing the RTP media packet being currently forwarded and the received RTP media packet when the priority of the RTP media packet being currently forwarded is equal to the priority of the received RTP media packet and the RTP media packet being currently forwarded and the received RTP media packet correspond to different source terminals; and
   forwarding the mixed RTP media packets to a receiving terminal.

8. The method according to claim 1, wherein the determining the type of the RTP media packet comprises:
   determining the type of the RTP media packet according to a PT (packet type) field and a CSRC (contributing source) field in a packet header of the RTP media packet.

9. The method according to claim 8, wherein the determining the type of the RTP media packet according to the PT field and the CSRC field in the packet header of the RTP media packet comprises:
  obtaining a value of the PT field in the packet header of the RTP media packet;
  determining, when the value of the PT field is a first value, that the RTP media packet is the DTMF packet;
  obtaining, when the value of the PT field is a second value, a value of the CSRC field in the packet header of the RTP media packet;
  determining, when the value of the CSRC field is a third value, that the RTP media packet is the IVR voice packet; and
  determining, when the value of the CSRC field is a fourth value, that the RTP media packet is the call voice packet.

10. A forwarding server, comprising at least one memory, at least one processor, and a computer program stored on the at least one memory and executable on the at least one processor, the at least one processor is, when executing the program, configured to:
  receive a RTP (real-time transport protocol) media packet;
  determine a type of the received RTP media packet;
  determine a priority of the received RTP media packet according to the type of the received RTP media packet;
  determine an RTP media packet having a higher priority among the received RTP media packet and an RTP media packet being currently forwarded, and forward the determined RTP media packet having the higher priority, wherein RTP media packets are classified into three types: a call voice packet, an interactive voice response (IVR) voice packet, and a dual-tone multi-frequency (DTMF) packet, a priority of the IVR packet is higher than a priority of the DTMF packet, and the priority of the DTMF packet is higher than a priority of the call voice packet; and
  operate in a first state indicating an initial state, a second state indicating that the RTP media packet being currently forwarded is the call voice packet, a third state indicating that the RTP media packet being currently forwarded is the DTMP voice packet, and a fourth state indicating that the RTP media packet being currently forwarded is the IVR voice packet.

11. The forwarding server according to claim 10, wherein a priority of the RTP media packet being currently forwarded is indicated by priority indication information, and the at least one processor is configured to:
  discard an RTP media packet having a lower priority among the received RTP media packet and the RTP media packet being currently forwarded.

12. The forwarding server according to claim 11, wherein the at least one processor is further configured to:
  update the priority indication information according to the priority of the received RTP media packet when the priority of the RTP media packet being currently forwarded is lower than the priority of the received RTP media packet.

13. The forwarding server according to claim 11, wherein the at least one processor is further configured to:
  discard a plurality of received RTP media packets in response to priorities of the plurality of received RTP media packets being lower than the priority of the RTP media packet being currently forwarded, and accumulate a discarding quantity of the plurality of received RTP media packets that are discarded; and
  lower the priority indicated by the priority indication information when the accumulated discarding quantity is greater than a preset threshold, reset the discarding quantity to 0 and re-accumulate the discarding quantity of received RTP media packets that are discarded.

14. The forwarding server according to claim 13, wherein the at least one processor is further configured to:
  adjust the priority indicated by the priority indication information to a lowest priority, or a priority lower than the current priority indicated by the priority indication information, or a priority of a currently received to-be-forwarded RTP media packet.

15. The forwarding server according to claim 11, wherein the at least one processor is further configured to:
  adjust the priority indicated by the priority indication information to a lowest priority when the received RTP media packet comprises a session end identifier.

16. A non-transitory computer-readable storage medium, storing a computer program executable by a computer device, the computer program, when run on the computer device, causing the computer device to perform:
  receiving a RTP (real-time transport protocol) media packet;
  determining a type of the received RTP media packet;
  determining a priority of the received RTP media packet according to the type of the received RTP media packet;
  determining an RTP media packet having a higher priority among the received RTP media packet and an RTP media packet being currently forwarded, and forwarding the determined RTP media packet having the higher priority, wherein RTP media packets are classified into three types: a call voice packet, an interactive voice response (IVR) voice packet, and a dual-tone multi-frequency (DTMF) packet, a priority of the IVR packet is higher than a priority of the DTMF packet, and the priority of the DTMF packet is higher than a priority of the call voice packet; and
  operating in a first state indicating an initial state, a second state indicating that the RTP media packet being currently forwarded is the call voice packet, a third state indicating that the RTP media packet being currently forwarded is the DTMP voice packet, and a fourth state indicating that the RTP media packet being currently forwarded is the IVR voice packet.

17. The computer-readable storage medium according to claim 16,
  wherein a priority of the RTP media packet being currently forwarded is indicated by priority indication information, and the computer program further cause the computer device to perform:
  discarding an RTP media packet having a lower priority among the received RTP media packet and the RTP media packet being currently forwarded.

18. The method according to claim 1, wherein:
  the forwarding server is a forwarding server of a converged communication service platform;
  the IVR voice packet belongs to an IVR voice media stream generated by an IVR service module of the converged communication service platform; and
  the DTMP packet belongs to a DTMP voice media stream generated by a DTMP service module of the converged communication service platform.

19. The method according to claim 1, further comprising:
  determining whether to switch a state of the forwarding server according to a current state of the forwarding server and the RTP media packet having the higher priority among the received RTP media packet and the RTP media packet being currently forwarded; and in response to determining to switch the state of the forwarding server, updating the priority indication information to indicate the priority of the determined RTP media packet having the higher priority.

* * * * *